Sept. 6, 1932.　　　D. H. BRUMM　　　1,875,559
HAND PIECE FOR DENTAL TOOLS
Filed Feb. 24, 1930
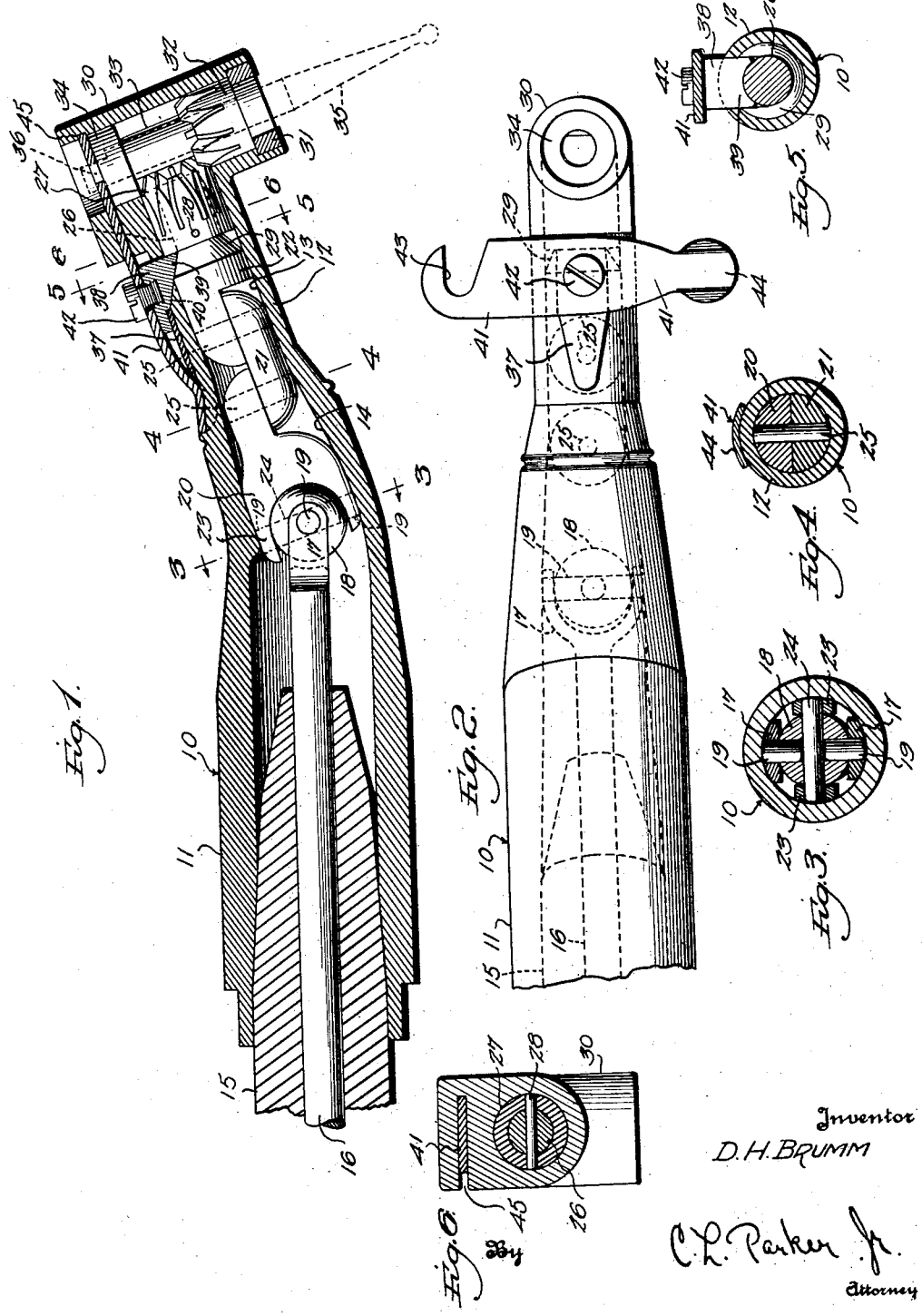
Inventor
D. H. BRUMM
By C. L. Parker Jr.
Attorney Patented Sept. 6, 1932

1,875,559

UNITED STATES PATENT OFFICE

DEAN H. BRUMM, OF LANSING, MICHIGAN

HAND PIECE FOR DENTAL TOOLS

Application filed February 24, 1930. Serial No. 431,019.

This invention relates to hand pieces for dental tools.

An important object of the invention is to provide a dental hand piece which may be quickly and readily disassembled to permit the parts to be cleaned and sterilized.

A further object is to provide a hand piece having a single operating element which performs several different functions including the locking of the associated parts in operative position whereby the releasing of the operating elements permits all of the parts of the hand piece to be disassembled whereby they may be cleaned and sterilized.

A further object is to provide a novel casing for a hand piece formed of bearing metal, and to so form the driving connections for the tool that the casing is adapted to form bearings for the rotating elements without the necessity of employing separate bearing bushings as in the case of ordinary hand pieces.

A further object is to provide driving connections for the hand piece of such character that one driving connection assembly may be employed in different handles or casings of varying angularity.

A further object is to provide driving connections for a dental tool including a flexible section to permit ready insertion of the driving connections, and wherein such flexible section operates as a solid shaft when the parts are assembled.

A further object is to provide a device of the character referred to wherein the releasing of a single operating element permits the withdrawal from the casing of the driving connections including the flexible section and the removal of the shaft and associated elements connected to the dental tool, the single operating element acting as locking means for the parts referred to and also as locking means for a thrust bearing member associated with the driving connections.

A further object is to provide a novel device for locking the main driving connections in operative position in the handle or casing and to act as a thrust bearing for such connections.

A further object is to provide a dog having a normal bias to inoperative position and adapted when in operative position to lock the driving connections in place and to act as a thrust bearing therefor, a single operating lever being provided for holding the dog in operating position and for securing the dental tool against displacement from the shaft with which it is associated.

Other objects and advantages of the invention will become apparent during the course of the following description.

In the drawing I have shown one embodiment of the invention. In this showing,

Figure 4 is a similar view on line 4—4 of Figure 1,

Figure 5 is a similar view on line 5—5 of Figure 1, and,

Figure 6 is a similar view on line 6—6 of Figure 1.

Figure 1:
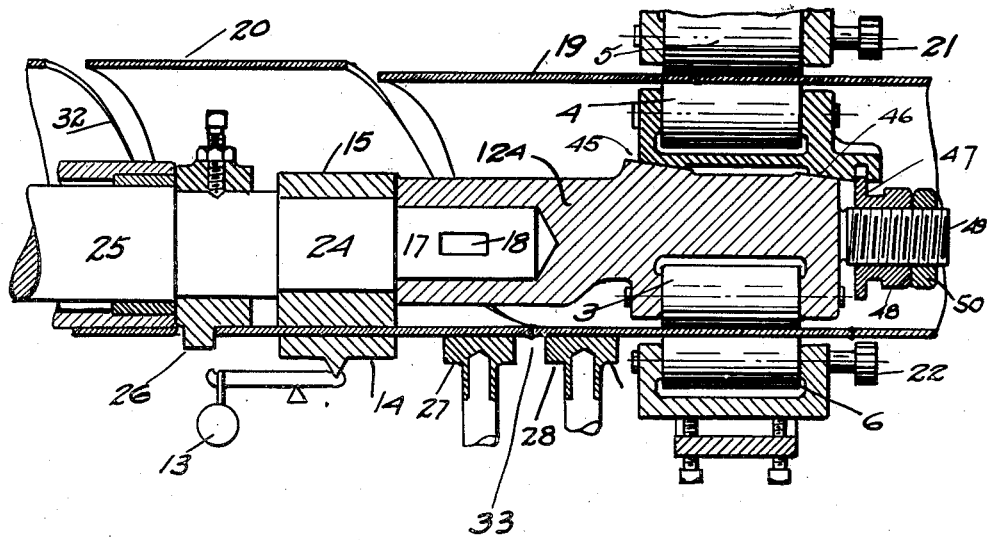
Figure 1 is a central vertical sectional view.
Figure 2:
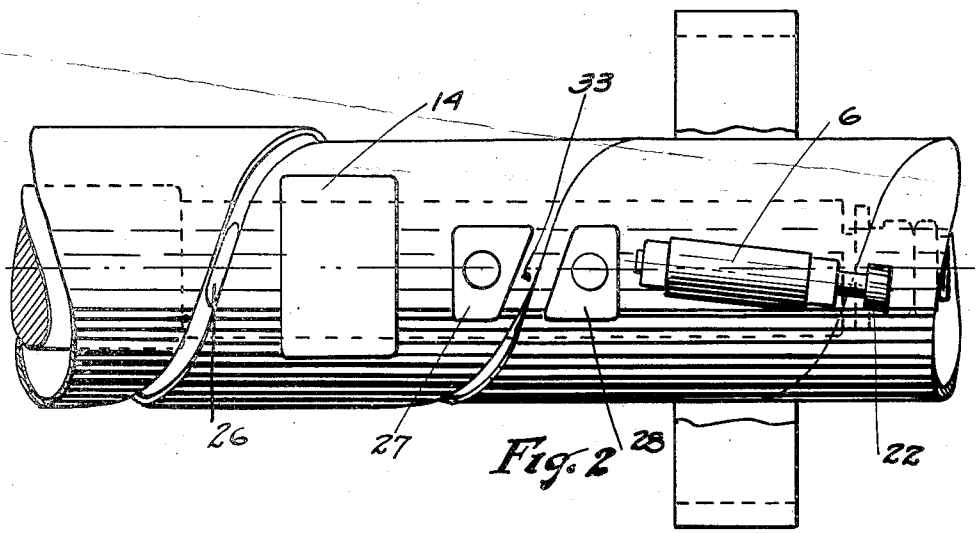
Figure 2 is a plan view showing the locking lever in inoperative position.
Figure 3:
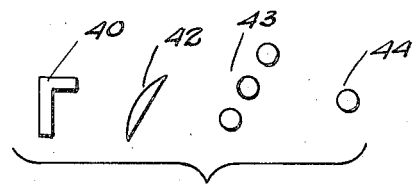
Figure 3 is a transverse section on line 3—3 of Figure 1.

Referring to the drawing, the numeral 10 indicates the casing or handle of the hand piece as a whole, which is preferably formed of bearing metal such as bronze, for a purpose to be described. The casing 10 comprises a relatively heavy inner section 11 and a reduced outer section 12, these sections being arranged at any desired angle with respect to each other, but preferably at an angle of between zero and 35 degrees. The casing section 12 is provided with a bore having an outer cylindrical end 13 and an inner slightly flaring portion 14.

The section 11 of the casing is adapted to receive the end of the usual tubular mounting 15 in which is journalled a dive shaft 16. The end of the shaft 16 is provided with a yoke 17 between the arms of which is mounted a ball 18. Pins 19 are carried by the arms of the yoke 17 and project into openings formed in the ball 18. The pins 19 preferably are soldered at their outer ends to the arms of the yoke 17 to be carried thereby.

Within the bore of the handle section 12 is arranged a flexible shaft preferably comunitary construction when the device is in operation.

Except for the provision of the collar 31 in the head of the device, the interior of the head is of uniform diameter. Accordingly after the pinion 27 and associated parts have been removed, the driving elements for the burr, including the pinion 32, shaft 33 and collar 34, may be withdrawn from the head through the upper end thereof. Accordingly it will be apparent that the single operation of manually moving the lever 41 to inoperative position permits the entire device to be disassembled for cleaning and sterilizing.

The casing 10 is preferably made of non-corrosive bearing metal, such as bronze, and accordingly the casing readily may be sterilized without corrosion taking place. The parts of the device are so designed that the casing acts as a bearing for most of the rotating elements, thus eliminating the provision of separate bearings for this purpose, and consequently simplifying the device.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A hand piece for dental tools comprising a casing, a drive shaft extending into one end of said casing, transmission means arranged in the other end of said casing and connected to said drive shaft, a tool holding shaft journalled in the last named end of said casing, a gear carried by said last named shaft, a gear carried by said transmission means and meshing with said first named gear, and a thrust take-up element connected to said casing and engaging an annular portion of said transmission means, said casing being provided in one side with an opening through which said thrust take-up element projects, said element being releasable for outward substantially radial movement from said transmission means to permit withdrawal thereof from the casing through the first named end thereof.

2. A hand piece for dental tools comprising a casing, a drive shaft extending into one end of said casing, transmission means arranged in the other end of said casing and connected to said drive shaft, a tool holding shaft journalled in the last named end of said casing, a gear carried by said last named shaft, a gear carried by said transmission means and meshing with said first named gear, a thrust take-up element for said transmission means, said casing being provided in one side with an opening through which said element projects, and means for normally holding said element in operative position, said last named means being releasable to permit outward movement of said thrust take-up element from engagement with said transmission means to permit withdrawal thereof from said casing.

3. A hand piece for dental tools comprising a casing, a drive shaft extending into one end of said casing, transmission means arranged in the other end of said casing and connected to said drive shaft, a tool holding shaft journalled in the last named end of said casing, a gear carried by said last named shaft, a gear carried by said transmission means and meshing with said first named gear, an element adapted to assume an operative position to act as thrust take-up means for said transmission means, said casing being provided with an opening through which said element projects, resilient means tending to move said element out of engagement with the transmission means, and releasable means for holding said element in operative position.

4. A hand piece for dental tools comprising a casing, a drive shaft extending into one end of said casing, transmission means including a shaft and a gear rotatably mounted in the other end of said casing and connected to said drive shaft, a tool holding shaft journalled in the last named end of said casing, a gear carried by said shaft and meshing with said first named gear, an element adapted to assume an operative position to act as thrust take-up means for said transmission means and to assume an inoperative position released from said transmission means to permit withdrawal thereof from said casing through the first named end thereof, and common means for holding said tool holding shaft in said casing and for maintaining said thrust take-up element in operative position.

5. A device constructed in accordance with claim 4 provided with resilient means tending to move said thrust take-up element to inoperative position.

6. A hand piece for dental tools comprising a casing, a drive shaft extending into one end of said casing, transmission means including a shaft and a gear mounted in the other end of said casing and provided with an annular groove, said transmission means being connected to said drive shaft, a tool holding shaft journalled in the last named end of said casing and removable therefrom, a gear carried by said last named shaft and meshing with said first named gear, an element adapted to engage in said annular groove to act as thrust take-up means for said transmission means and adapted to assume an inoperative position released from said annular groove to permit withdrawal of said transmission means through the first named end of said casing, and locking means for locking said element in operative position in engagement with said annular groove.

7. A hand piece for dental tools comprising a casing, a drive shaft extending into one end of said casing, transmission means including a shaft and a gear mounted in the other end of said casing and provided with an annular groove, said transmission means being connected to said drive shaft, a tool holding shaft journalled in the last named end of said casing and removable therefrom, a gear carried by said last named shaft and meshing with said first named gear, an element adapted to engage in said annular groove to act as thrust take-up means for said transmission means and adapted to assume an inoperative position released from said annular groove to permit withdrawal of said transmission means through the first named end of said casing, and a locking lever operative for holding said element in engagement with said annular groove and for securing said tool holding shaft in position, said lever being movable to release said element to permit withdrawal of said transmission means from the first named end of said casing and to permit removal of said tool holding shaft and said second named gear.

8. A device constructed in accordance with claim 7 wherein said lever is provided with a portion engageable with a tool carried by said tool holding shaft to secure the tool in position, when said lever is in operative position.

9. A device constructed in acordance with claim 7 wherein said casing is provided with a slot in which one end of said lever is adapted to be arranged when in operative position, said end of said lever having a notch therein adapted to engage a tool and hold it in position in said tool holding shaft.

10. A hand piece for dental tools comprising a casing, a drive shaft extending into one end of said casing, transmission means including a shaft and a gear mounted in the other end of said casing and provided with an annular groove, said transmission means being connected to said drive shaft, a head carried by said casing at the extremity of the last named end thereof, a tool holding shaft journalled in said head and removable therefrom, a gear carried by said last named shaft and meshing with said first named gear, a dog adapted to engage in said annular groove to act as thrust take-up means for said transmission means, resilient means tending to move said dog to inoperative position out of engagement with said groove to permit withdrawal of said transmission means and said first named gear through the first named end of said casing, and locking means for holding said dog in operative position in engagement with said annular groove.

11. A device constructed in accordance with claim 10 wherein said last named means comprises a pivoted lever having a portion engageable with said tool holding shaft to hold it in position and to act as a thrust bearing therefor.

12. A hand piece for dental tools comprising a casing including a pair of integral angularly arranged sections, a drive shaft extending into one end of said casing, rotary transmission means including a shaft and a gear mounted in the other section of said casing and provided with an annular groove, the shaft of said transmission means including a plurality of flexibly connected sections substantially fixed against relative movement when in operative position in the second named section of said casing and adapted to be withdrawn through the first named end of said casing, a universal connection between said shafts, a head carried by said casing at the extremity of the second named section thereof, a tool holding shaft journalled in said head and removable therefrom, a gear carried by said last named shaft and meshing with said first named gear, a thrust element normally mounted in said annular groove to act as thrust take-up means for said transmission means and movable out of said groove to permit withdrawal of said transmission means, and means for normally locking said thrust element in operative position in engagement with said annular groove.

13. A device constructed in accordance with claim 12 wherein said last named means is provided with a portion engageable with said tool holding shaft to prevent removal thereof and to act as a thrust bearing therefor.

14. A device constructed in accordance with claim 12 wherein said last named means comprises a lever pivotally supported intermediate its ends and adapted to assume an operative position to hold said thrust element in operative position, said lever having one end adapted when in operative position to lock said tool holding shaft against withdrawal and to act as a thrust bearing therefor.

15. A hand piece for dental tools comprising a casing including a pair of integral angularly arranged sections, a drive shaft extending into the end of one of said casing sections, rotary transmission means including a shaft and a gear mounted in the other casing section and provided with an annular groove, the shaft of said transmission means including a plurality of flexibly connected sections substantially fixed against relative movement when in operative position in the second named casing section and adapted to be withdrawn through said end of the first named casing section, a universal connection between said shafts, a head carried by said casing at the end of and at an angle to the second named section thereof, a tool holding shaft journalled in said head, a bearing in one end of said head supporting said tool holding shaft, the latter shaft being removable through the opposite end of said head, a gear carried by said last named shaft and meshing with said first named gear, a thrust element normally mounted in said annular groove to act as a thrust bearing for said transmission means and movable out of said groove to permit withdrawal of said transmission means and said first named gear, and a locking device adapted to assume an operative position for holding said thrust bearing in said annular groove and for preventing removal of said tool holding shaft through the last named end of said head.

16. A device constructed in accordance with claim 15 wherein said locking device comprises a lever pivotally connected intermediate its ends to said thrust element, said head being provided with a slot transverse to the axis thereof in which one end of said lever is adapted to be arranged when in operative position to engage said tool holding shaft to lock the latter in position and to act as a thrust bearing therefor.

17. A device constructed in accordance with claim 15 provided with a spring normally urging said thrust element out of said annular groove to release said transmission means for withdrawal from said casing, said locking device comprising a lever pivotally connected intermediate its ends to said thrust element and having one of its ends adapted to engage said tool holding shaft to lock the latter in position and to act as a thrust bearing therefor.

18. A device constructed in accordance with claim 15 provided with a spring normally urging said thrust element out of said annular groove to release said transmission means for withdrawal from said casing, said head being provided with a slot transverse to the axis thereof, said locking device comprising a lever pivotally connected intermediate its ends to said thrust element and having one of its ends movable into said slot whereby the latter holds said thrust element in operative position, the said end of said lever when in operative position being engageable with said tool holding shaft to lock the latter in position and to act as a thrust bearing therefor, and being provided with a notch adapted to engage and hold a tool in position in said tool holding shaft.

19. A hand piece for dental tools comprising a casing including a pair of integral angularly arranged sections, a drive shaft extending into one of said sections, rotary transmission means including a shaft and a gear mounted in the other casing section, the shaft of said transmission means comprising a plurality of flexibly connected sections substantially fixed against relative movement when in operative position in said second named casing section, said last named casing section having an internal bore corresponding to the diameter of said transmission shaft to act as a bearing therefor, said gear being at least as small in diameter as said transmission shaft to permit its withdrawal therewith from said casing, a universal connection between said shafts, said transmission shaft being provided with an annular groove, a thrust element carried by the second named casing section and normally operative in said groove, said thrust element being movable outwardly to release it from said groove, a tool holding shaft rotatably supported by the second named casing section, and connections between said gear and said tool holding shaft.

In testimony whereof I affix my signature.

DEAN H. BRUMM.

Sept. 6, 1932.　　　　L. CAMMEN　　　　1,875,560

PIPE MAKING MACHINERY

Filed Nov. 17, 1930　　　2 Sheets-Sheet 1

INVENTOR.
Leon Cammen